Patented June 22, 1937

UNITED STATES PATENT OFFICE 2,084,349

METHOD OF MAKING WEAR RESISTING MATERIALS

Clemens A. Laise, Tenafly, N. J.

No Drawing. Application September 10, 1934, Serial No. 743,409

4 Claims. (Cl. 75—137)

My invention is directed to a process for producing wear-resisting materials and to the material resulting from the process, and has for one of its objects the production of a material which is extremely hard and tough and which will retain these properties when operated at elevated temperatures.

The materials produced by my new process are adapted for use as tips for cutting tools, nibs for wire drawing and extrusion dies, sand blast nozzles, contact points, borers for oil well drilling, in fact for practically all types of mechanical and electrical apparatus subject to extreme wear and tear.

Furthermore, the materials of the present invention are non-corrosive and lend themselves to use under conditions where prior wear-resisting materials corrode, tarnish or rust.

My improved materials also are of such a nature as to permit of their use in the arts in place of commercial diamonds.

The starting materials employed in the practice of my invention consist of alloy powders composed of a refractory metal such as tungsten, tantalum, titanium, zirconium, molybdenum, chromium, thorium, rhenium, etc., in fact any refractory carbide-forming metal having a melting point above 1500° C. and a base metal such as iron, manganese, nickel, cobalt, silver, copper, etc. having a melting point above 1000° C.

These powders are heat treated with carbon or carbon and boron to produce hard refractory carbides or carbides and borides.

I then crush the resultant products into fine powders and oxides of iron, nickel, cobalt or other base metal are added as a bonding material and the mass ball-milled to impalpable powders, these powders being subjected to low temperature heat treatment in hydrogen so that the carburized alloy powders are interspersed with pure elementary base metal powders.

The product thus produced is then pressed into suitable shape and heat treated so as to strengthen sufficiently to handle and finally subjected to a high temperature heat treatment with or without pressure in a carbonaceous, nitrogenous or other reducing atmosphere at a temperature slightly above the plasticizing temperature of the final bonding metal, for example 1400° C. but below the melting temperature thereof.

Essentially, therefore, my process involves alloying refractory metal powders with base metal powders; carburizing or carburizing and boronizing the alloy; powdering the resulting product and mixing with base metal oxides; reducing the mixture in hydrogen, for example, at a low temperature, below 500° C.; compacting the resulting mass into desired shapes, baking and finally heat treating at a temperature, say above 1400° C., but in any event above the plasticizing temperature but below the melting temperature of the base metal bonding agent.

I find that the process briefly outlined above produces a hard metal composition far superior to that produced by prior processes. In fact the composition produced by my process is harder, more than twice as tough and stands up more than 25% to 100% as long as a composition produced by mixing the same amounts of base metals with the same amount of tungsten carbide by the processes of the prior art. I find also that the structure of the compositions produced by my process as compared to the structure resulting from mixing tungsten carbide with elementary base metal powder is very much finer in grain size and much more compact. Some carbide compositions heretofore have been quite hard, but simultaneously quite brittle. My improved compositions may have a hardness of 88 to 89 on the Rockwell "A" scale and yet simultaneously be exceedingly tough so that its tensile strength exceeds 300,000 pounds per square inch.

As a specific example in the practice of my invention I may proceed as follows, assuming that the final product consists of a carburized tungsten, chromium metal alloy of the iron group bonded with a base metal of the same group. I have already mentioned that my preferred refractory metal is tungsten, although I may use molybdenum, tantalum, titanium, chromium or mixtures of the same, etc. Similarly as already mentioned my preferred base metal is cobalt although I may use iron, nickel, cobalt, manganese or mixtures of these.

The first stage in my process is the alloying stage of producing a mixture of alloy powders of a refractory metal alloyed with metals of the iron group. Accordingly mixtures in the following proportions are prepared: 180 grams of fine cobalt oxide, 10 grams of chromium and 10 grams of iron oxide are weighed out and mixed, a solution containing 25 grams of thorium nitrates added and the mass slurried into a paste and then dried out. Instead of the cobalt oxide I may use a precipitated cobalt-tungstate containing 180 grams of cobalt oxide and iron-tungstate containing 10 grams of iron oxide so that the total contains about 6% to 7% cobalt based on the carbides. These are mixed with tungsten oxide preferably prepared by igniting ammonium paratungstate, in proportion of 2350 grams of tungsten oxide to the above mixture.

The mixture of dry powders is milled to insure a uniform mixture and then placed in nickel boats and treated in an electrically or gas heated furnace through which hydrogen is allowed to flow at about 20 cubic feet per hour, the temperature of the furnace being raised ultimately to from 800° C. to 950° C. By this treatment the powders are reduced and the metals lightly sintered and alloyed together so that they may be removed from the boats, broken up and ground into fine powder. The powder is sieved through a 200 mesh sieve and is now ready for the second or carburizing stage of my process.

The mixed alloy powders are next mixed with lamp black the quantity of lamp black added depending upon the amount of the refractory carbide-forming metal present, the amount of carbon being sufficient to produce tungsten carbide, chromium carbide, and iron carbide in the above example. In the present instance I add 65 grams of carbon (lamp black) per kilo of mixture to be carburized. The mixture is then milled and finally placed in carbon tubes closed at both ends.

These tubes are then placed in a gas furnace in an iron pipe, heated to about 950° C. in an atmosphere of hydrogen for two hours. This constitutes the first carburizing stage.

The material is allowed to cool and then removed from the furnace and broken up and again sieved through a 200 mesh sieve. The material is then milled, as before, and subjected to final carburizing treatment in carbon tubes in suitable electric or gas furnaces at a temperature of about 1250° C. in a carbonaceous, hydrogen or reducing atmosphere.

The resultant product consists of the alloy powders carburized so that the tungsten, iron and chromium have been converted into carbide alloyed with cobalt and this material is powdered to pass through a 300 mesh sieve and mixed with a bonding material such as cobaltic oxide in the proportion of about 1000 grams of the carburized powders to 115 grams of cobalt oxide. This mixture is then milled until reduced to an impalpable powder passing a 350 mesh sieve.

The milled mixture of carburized alloys and cobalt oxide is now placed in nickel boats and reduced in an electric furnace or gas furnace at about 350° C. in hydrogen gas, this reduction being carried out very slowly at this low temperature so that the resultant product consists of the carburized alloy powders mixed with cobalt metal powder.

The material is now ready to be shaped into various forms as by pressing in suitable moulds or by mixing with organic binders and extruding the same through various shaped dies, the pressure employed varying over a wide range, from, for example, 3 tons per square inch to 30 tons.

The moulded pieces are now baked sufficiently to produce adherent bodies and then packed in a carbon boat or tube surrounded by lamp black and placed in the final heat treating furnace which is operated at about 1450° C., in any event a temperature below the melting point of the bonding material, although above the plasticizing temperature thereof, this treatment being carried out in a hydrogen or carbonaceous atmosphere. The moulded pieces are only allowed to remain in this furnace until the bonding material becomes sufficiently plastic to bind the particles of alloys and carbides together so as to produce a very compact fine grained homogeneous hard body having a Rockwell hardness on the A scale at room temperature of 88 to 89 and simultaneously a tensile strength exceeding 300,000 pounds per square inch.

I may increase the toughness and hardness of my improved product still further by removing from the furnace and compressing in a suitable press while the material is still hot and plastic. This may be repeated several times thereby producing a wrought carbide composition of extreme hardness and toughness.

In those cases where a combined carburizing and boronizing effect is desired I may add boron suboxide or boron nitride to the original mixture before alloying or just before carburizing. In this case the total carbon and boron in the composition should not exceed 15%.

The final heat treatment above described, carried out at a temperature given as 1450° C., by way of example, is below the melting point of the bonding material but above its plasticizing point in order that the bonding material may be absorbed by the carburized alloy powders. Usually I find that the shorter the time of the final heat treatment the more compact and less porous the resultant product.

My final hard compact tough wear-resisting composition may in its final state comprise substantially the following:

| | Percent |
|---|---|
| Refractory metals (such as tungsten) | 92.5 to 57.5 |
| Iron | 0.25 to 5.0 |
| Chromium and thorium | 0.25 to 2.5 |
| Cobalt and nickel | 2.0 to 22.0 |
| Carbon and boron | 5.0 to 13.0 |

What I claim is:—
1. The method which comprises intimately mixing powders of refractory metals and base metals, alloying the same at a temperature below the melting point of any of the constituents of the mixture, converting the alloy into impalpable powder and carburizing and boronizing the same until it contains not in excess of 15% combined carbon and boron.

2. The method which comprises intimately mixing powders of refractory metals and base metals, alloying the same at a temperature below the melting point of any of the constituents of the mixture, converting the alloy into impalpable powder, carburizing and boronizing the same until it contains not in excess of 15% combined carbon and boron, and intimately mixing with base metal powder.

3. The method which comprises intimately mixing powders of refractory metals and base metals, alloying the mixture below the melting point of any of its constituents, powdering the alloy and carburizing and boronizing the same until it contains not in excess of 15% combined carbon and boron, intimately mixing this product with base metal powder, compressing into desired shape and then heating to a temperature below the melting point but above the plasticizing temperature of the base metal.

4. The method which comprises intimately mixing powders of refractory metals and base metals, alloying the mixture below the melting point of any of its constituents, powdering the alloy and carburizing and boronizing the same until it contains not in excess of 15% combined carbon and boron, intimately mixing this product with base metal powder having a melting temperature above and a plasticizing temperature below 1450° C., compressing into desired shape and then heating to a temperature of about 1450° C.

CLEMENS A. LAISE.